(12) United States Patent
Wallace et al.

(10) Patent No.: US 9,169,728 B2
(45) Date of Patent: Oct. 27, 2015

(54) DYNAMIC LOAD REDUCTION SYSTEM

(75) Inventors: Thomas Tracy Wallace, Loveland, OH (US); William Joseph Simpson, Mason, OH (US); John Howard List, Cincinnati, OH (US); Jason Jianxin Tao, Centerville, OH (US); Tod Robert Steen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 886 days.

(21) Appl. No.: 13/314,303

(22) Filed: Dec. 8, 2011

(65) Prior Publication Data

US 2013/0149139 A1 Jun. 13, 2013

(51) Int. Cl.
*F01D 21/04* (2006.01)
*F01D 5/02* (2006.01)
*F01D 25/04* (2006.01)

(52) U.S. Cl.
CPC ............... *F01D 5/026* (2013.01); *F01D 21/04* (2013.01); *F01D 21/045* (2013.01); *F01D 25/04* (2013.01); *F05D 2260/31* (2013.01); *Y10T 403/645* (2015.01)

(58) Field of Classification Search
CPC ... F01D 21/04; F01D 21/045; F05D 2260/30; F05D 2260/31; F16B 7/10; F16B 19/02; F16B 43/00
USPC ....................................................... 415/214.1
See application file for complete search history.

(56) References Cited

U.S. PATENT DOCUMENTS

| | | | | |
|---|---|---|---|---|
| 2,291,992 A | * | 8/1942 | Stearns ........................ | 241/156 |
| 2,790,312 A | * | 4/1957 | Hagenlocher et al. .......... | 464/90 |
| 3,188,115 A | * | 6/1965 | Morrish et al. .................. | 285/18 |
| 3,333,872 A | * | 8/1967 | Crawford, Sr. et al. ........ | 285/374 |
| 3,985,377 A | * | 10/1976 | Ahola et al. .................... | 285/9.2 |
| 4,071,265 A | * | 1/1978 | Wallace ....................... | 285/136.1 |
| 4,236,562 A | * | 12/1980 | Molina ......................... | 411/103 |
| 4,871,181 A | * | 10/1989 | Usher et al. ................... | 277/627 |
| 4,906,036 A | * | 3/1990 | James ........................... | 292/202 |

(Continued)

FOREIGN PATENT DOCUMENTS

CN 1948732 A 4/2007

OTHER PUBLICATIONS

Unofficial English Translation of Chinese Office Action issued in connection with corresponding Cn Application No. 201210521830.X on Mar. 31, 2015.

*Primary Examiner* — Sean J Younger
(74) *Attorney, Agent, or Firm* — General Electric Company; William Scott Andes

(57) ABSTRACT

Bolted together first and second flanges include bolts disposed through first bolt holes in the first flange. The bolts extend at least partially through second holes in the second flange. Bolt include bolt heads, threads, and shanks therebetween. Crushable spacers disposed around the shanks of a first plurality of the bolts and contacting and axially extending between the bolt heads and the first flange. Bushings disposed around a second plurality of the bolts and contacting and axially extending between the bolt heads and the second flange. A shank outer diameter may be smaller than a thread diameter and heat shrink tubing may be disposed around the bolt shanks of at least some of the spacers. First bolt holes may extend into an open annular slot on first flange and second holes may extend partially through a forward extending annular rail of second flange with rail received within slot.

34 Claims, 5 Drawing Sheets

(56) References Cited

U.S. PATENT DOCUMENTS

| | | | |
|---|---|---|---|
| 4,928,998 A * | 5/1990 | Brandener | 285/49 |
| 4,976,457 A * | 12/1990 | Carter | 285/136.1 |
| 5,040,805 A * | 8/1991 | Ozora | 277/627 |
| 5,060,986 A * | 10/1991 | Carter | 285/136.1 |
| 5,292,215 A * | 3/1994 | Roberts, III | 411/424 |
| 5,683,119 A * | 11/1997 | Emmons et al. | 285/146.3 |
| 5,697,650 A * | 12/1997 | Brown | 285/197 |
| 5,728,445 A * | 3/1998 | Murakami et al. | 428/113 |
| 5,779,282 A * | 7/1998 | Ezze | 285/261 |
| 6,036,612 A * | 3/2000 | Katogi et al. | 474/110 |
| 6,176,663 B1 * | 1/2001 | Nguyen et al. | 411/368 |
| 6,200,223 B1 * | 3/2001 | Martens | 464/99 |
| 6,279,965 B1 * | 8/2001 | Kida | 285/268 |
| 6,312,022 B1 * | 11/2001 | Brophy et al. | 285/268 |
| 6,374,665 B1 * | 4/2002 | Somppi et al. | 73/146 |
| 6,641,326 B2 * | 11/2003 | Schilling et al. | 403/337 |
| 7,056,053 B2 * | 6/2006 | Schilling et al. | 403/337 |
| 7,093,861 B2 * | 8/2006 | Sasada et al. | 285/261 |
| 7,093,996 B2 * | 8/2006 | Wallace et al. | 403/78 |
| 7,201,529 B2 * | 4/2007 | Lejeune | 403/2 |
| 7,546,743 B2 | 6/2009 | Bulman et al. | |
| 7,832,193 B2 | 11/2010 | Orlando et al. | |
| 7,897,241 B2 * | 3/2011 | Rice | 428/137 |
| 7,909,514 B2 | 3/2011 | Plona | |
| 2005/0201846 A1 * | 9/2005 | Santamaria | 411/108 |
| 2009/0139201 A1 | 6/2009 | Storace | |
| 2010/0129137 A1 | 5/2010 | Heidari et al. | |
| 2011/0299951 A1 * | 12/2011 | Cook | 409/131 |

* cited by examiner ic Load Reduction System

BACKGROUND OF THE INVENTION

1. Field of the Invention

The invention relates to bolted flange connections and, particularly, to such connections for limiting transmitted loads during unbalance events in turbomachinery.

2. Description of Related Art

Flanges are generally held together by bolts through bolt holes provided in each of the flanges and that are aligned with each other. Large radial, tangential, or axial loads with respect to an axial centerline of the bolted joint can impose bending moments or tensile forces in the flange that can cause deformation or rupture of the bolts.

During gas turbine engine operation, a foreign body, such as a bird, could impact the fan assembly and cause part or all of a fan blade to become detached from the rotor disk. Such blade loss is a certification requirement under FAA 14 CFR part 33 rules. Fan blade loss creates a large rotor imbalance, particularly, in early revolutions of the imbalance causing event. This results in the transmission of potentially damaging imbalance forces to the bolted connection, possibly resulting in the misalignment of the flanges and bearing which they help support.

This could be a particular problem in gas turbine engines and, more so, in aircraft gas turbine engines that use bolted connections to support bearings which, in turn, support rotatable rotors. Rotor blade failures, which can be caused by foreign objects that are drawn into the fan or compressor, can cause rotor unbalance conditions. Such rotor unbalance conditions can impose radial, circumferential, and possibly also axial loads sufficient to fail supporting structure causing loss of centerline. Such rotor unbalance conditions can cause unintended high shear, bending, or tensile loads, or a combination of such loads, applied to the flange connecting bolts, leading to structural damage, bolt deformation, and possibly to bolt rupture and separation of the bolted casings from each other. This can cause the centerline of the flange of the bearing casing to shift. This, in turn, can shift the radial location of the bearings which is an undesirable condition even with the engine shutoff and windmilling. Thus, it is highly desirable to maintain the centerline of the flange of the bearing casing supporting the bearing when there has been an unbalance load event like fan blade out and the engine will be shutoff and the fan windmilled.

SUMMARY OF THE INVENTION

A bolted flange assembly includes a first flange bolted to a second flange, a first circular row of first bolt holes extending axially through the first flange, bolts disposed through the first bolt holes and through second bolt holes extending axially at least partially through the second flange. Each of the bolts include a bolt head, a thread, and a shank therebetween. Crushable spacers disposed around the shanks of a first plurality of the bolts contact and axially extend between the bolt heads and the first flange. Bushings disposed around a second plurality of the bolts contact and axially extend between the bolt heads and the second flange.

In an exemplary embodiment of the assembly, a shank outer diameter of the shanks is smaller than a thread diameter of the threads and heat shrink tubing is disposed around the bolt shanks of at least some of the spacers. The spacers contact the first flange on a first flat annular surface of the first flange and the bushings contact the second flange on a second flat annular surface of the second flange. The spacers include tubular bodies extending axially between first and second enlarged or flanged ends.

The second bolt holes may be threaded and extend axially partially through the second flange.

The bushings may include tubular bushing bodies axially extending between first bushing ends and second bushing ends. Annular bushing flanges may be on the first bushing ends adjacent the bolt heads with gaps between the annular bushing flanges and the first flange.

In a more particular exemplary embodiment of the assembly, the first bolt holes extend axially through the first flange into an aftwardly open annular slot on the first flange, the second bolt holes extend partially through a forward extending annular rail of the second flange, and the annular rail is received within the annular slot.

In another more particular exemplary embodiment of the assembly, the first bolt holes extend axially through the first flange, the second bolt holes extend partially through a forward extending annular rail of the second flange, and the annular rail is received within an inner or outer rabbet defined by an inner or outer lip respectively extending aftwardly from the first flange.

The bolted flange assembly may be incorporated in a gas turbine engine forward bearing system including a forward bearing support structure and a fan frame. The first flange is at an aft end of the forward bearing support structure bolted to the second flange on the fan frame.

The gas turbine engine forward bearing system may be incorporated in an aircraft turbofan gas turbine engine including in downstream serial flow communication, a fan, a low pressure compressor or booster, a high pressure compressor, a combustor, a high pressure turbine, and a low pressure turbine circumscribed about an engine centerline axis. The low pressure turbine is joined by a low pressure drive shaft to the fan and the low pressure compressor or booster. The forward bearing support structure supports a forward bearing which rotatably supports, in part, the low pressure drive shaft.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
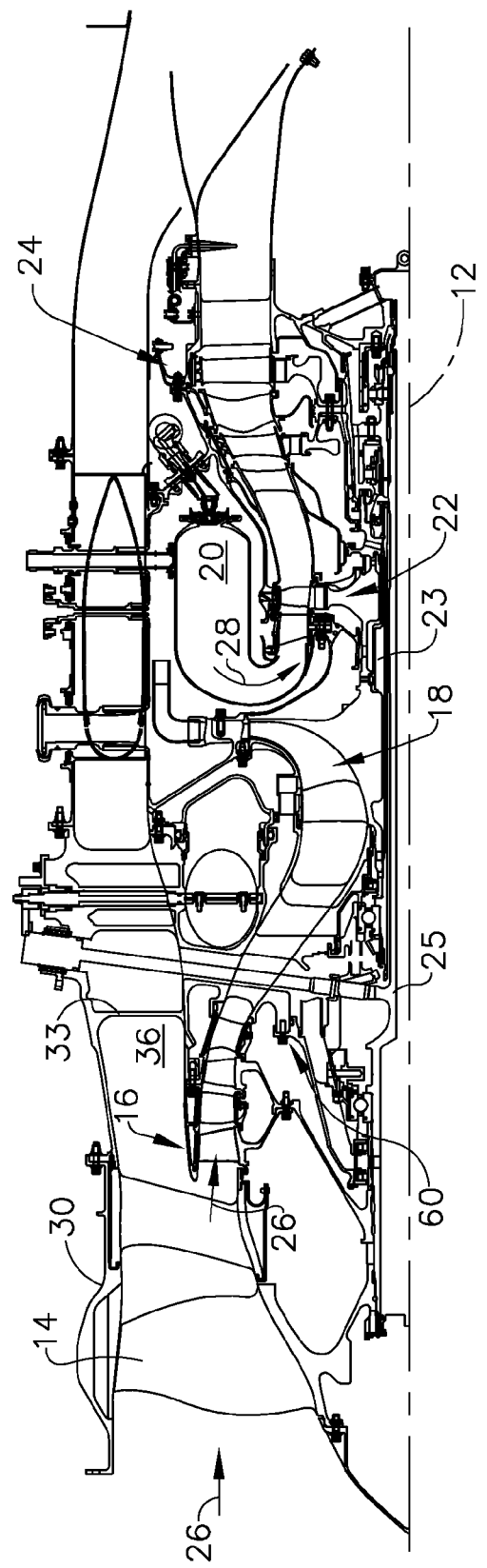
FIG. 1 is a cross-sectional side view illustration of an exemplary embodiment of an aircraft turbofan gas turbine engine with an exemplary embodiment of a dynamic load reduction system for a bolted flange assembly of a rotor bearing support.
Figure 2:
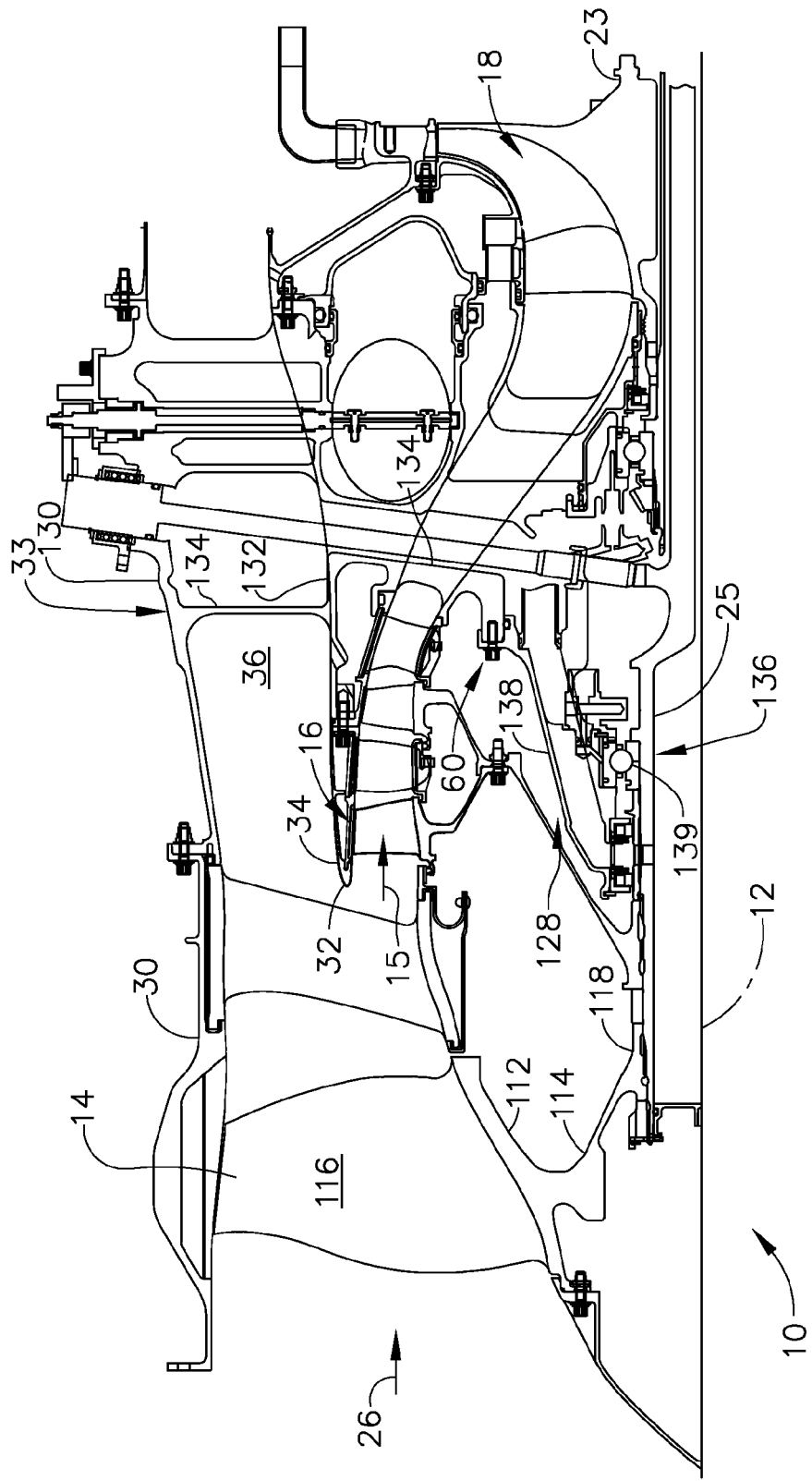
FIG. 2 is an enlarged cross-sectional side view illustration of a forward portion of the engine with the exemplary embodiment of the dynamic load reduction system illustrated in FIG. 1.

Illustrated in FIGS. 1 and 2 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a low pressure compressor or booster 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and the booster 16.

In typical operation, air 26 is pressurized by the fan 14 and produces an inner air flow 15 channeled through the booster 16 which further pressurizes the inner air flow 15. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24.

Referring more particularly to FIG. 2, a flow splitter 34 surrounding the booster 16 immediately behind the fan 14 includes a sharp leading edge 32 which splits the fan air 26 pressurized by the fan 14 into a radially inner stream channeled through the booster 16 and a radially outer stream channeled through the bypass duct 36. A fan casing 30 surrounding the fan 14 is supported by an annular fan frame 33.

The fan 14 includes a fan rotor 112 having a plurality of circumferentially spaced apart fan blades 116 which extend radially outwardly from a fan disk 114. The fan disk 114 is connected to a fan shaft 118 that is powered by the LPT 24. The fan rotor 112 is rotatably supported on the fan frame 33 by a support system 128. The fan frame 33 includes an annular outer casing 130, an inner hub 132, and a plurality of circumferentially spaced apart struts 134 extending therebetween. The struts 134 are airfoil shaped since bypass air passes between the adjacent ones thereof.

The support system 128 includes a forward bearing system 136 including a forward bearing support structure 138 supporting a forward bearing 139 (alternatively referred to as "No. 1 bearing"). The forward bearing 139 rotatably supports in part the low pressure drive shaft 25 which is connected to the fan shaft 118. The forward bearing 139 is a thrust bearing. The forward bearing support structure 138 illustrated in FIG. 2 is conical and is also referred to as a bearing casing. Other suitably shaped support structures may also be used to support the forward bearing. The forward bearing system 136 is disposed between the fan shaft 118 and the forward bearing support structure 138. The forward bearing support structure 138 is secured to the inner hub 132 of the fan frame 33.

FIGS. 2-5 illustrate a dynamic load reduction system 60 for a bolted flange assembly 64 of the forward bearing support structure 138. The forward bearing support structure 138 includes a first flange 146 at an aft end 148 of the forward bearing support structure 138. The first flange 146 is bolted to second flange 147 which connected to the inner hub 132 of the fan frame 33. The second flange 147 includes a forward extending annular rail 152 received within an aftwardly open annular slot 154 on the first flange 146.

A first circular row 156 of first bolt holes 158 extend axially through the first flange 146 into the annular slot 154. A corresponding second circular row 166 of threaded second bolt holes 168 extend axially partially into the forward extending annular rail 152 of the second flange 147. Bolts 160 are disposed through the first bolt holes 158 and screwed into the threaded second bolt holes 168. Each of the bolts 160 includes a bolt head 170, a shank 172, and a thread 174. The exemplary embodiment of the threaded second bolt holes 168 illustrated herein have threaded inserts 176 inserted therein to provide threads for the second bolt holes. Serrated lock rings 178 are used to hold the threaded inserts 176 in the second bolt holes 168. The exemplary embodiment of the bolt 160 disclosed herein has a shank outer diameter SD of the shank 172 that is smaller than a thread diameter TD of the thread 174.

Crushable spacers 182 are disposed around the shanks 172 of a first plurality 180 of the bolts 160. The spacers 182 contact and axially extend between the bolt heads 170 and a first annular surface 183, preferably flat, of the first flange 146. Each of the spacers 182 include a tubular body 186 extending axially between first and second enlarged or flanged ends 188, 190. The crushable spacers 182 are crushed and act to reduce rotating loads when the first and second flanges are rotated or pivoted relative to each other and to the centerline axis 12 as illustrated by the curved arrows A in the FIGS. This can occur as noted above during a transient event such as a blade out event. The crushable spacers 182 are designed to spread out the rotating load and reduce peak loads transmitted through the flanges into an adjacent structure.

Figure 3:
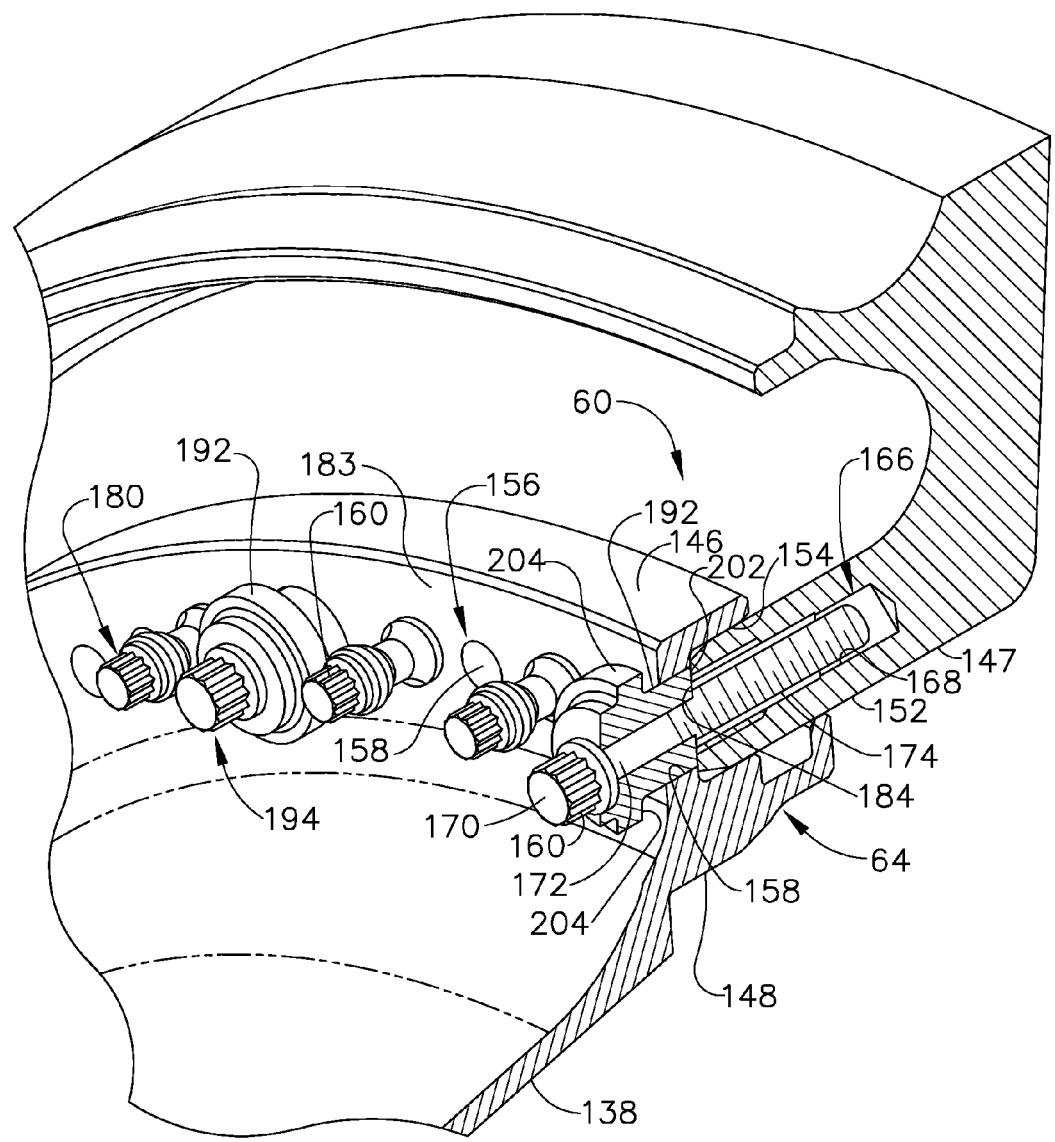
FIG. 3 is a perspective view illustration of the exemplary embodiment of the bolted flange assembly and the dynamic load reduction system illustrated in FIG. 2.
Figure 5:
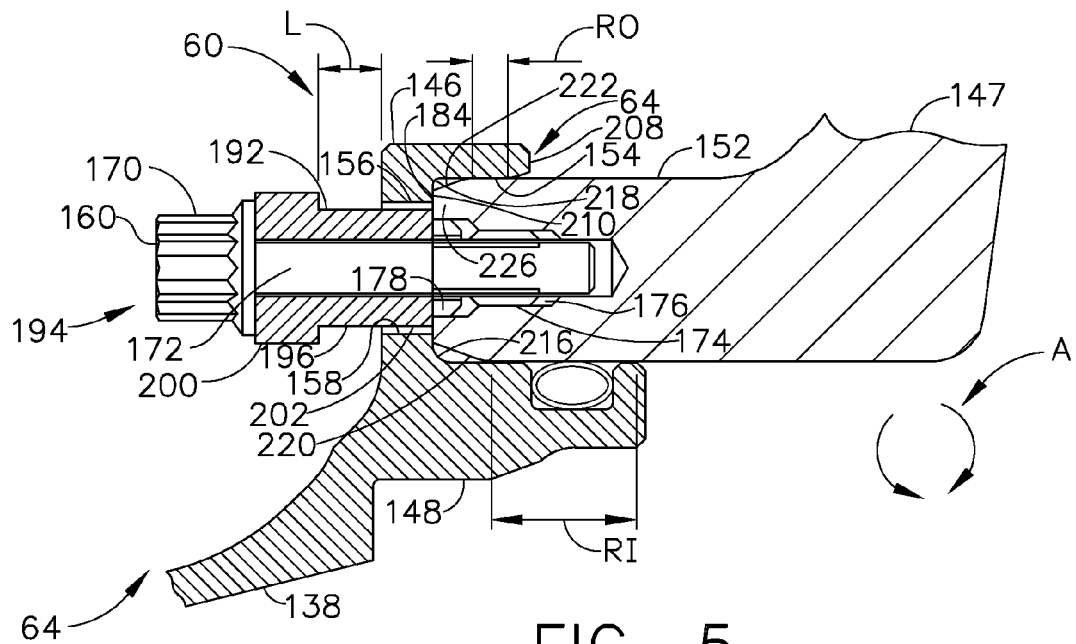
FIG. 5 is a cross-sectional view illustration of an exemplary bolt with a flanged bushing in the bolted flange assembly illustrated in FIG. 3.
Figure 4:
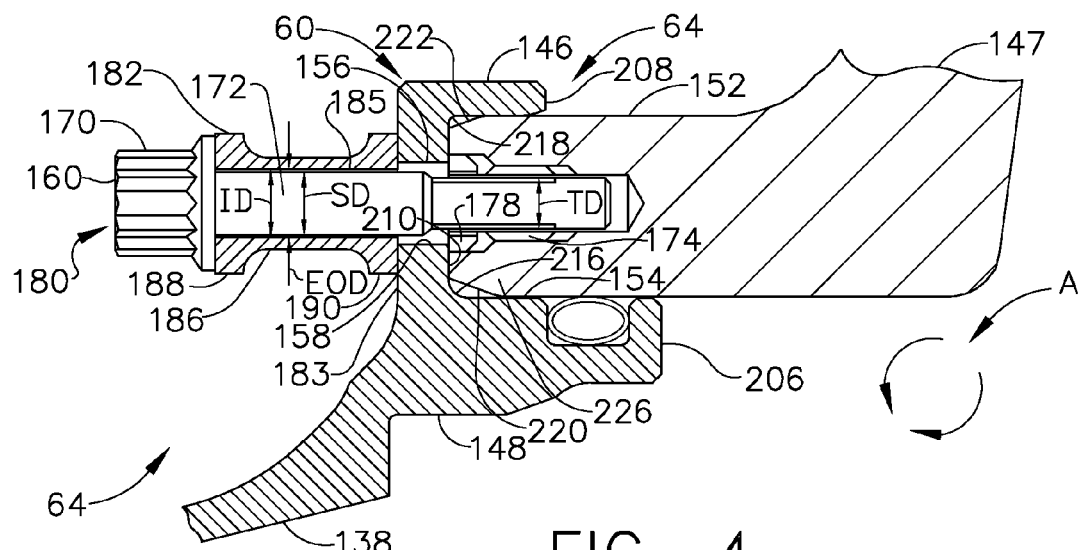
FIG. 4 is a cross-sectional view illustration of an exemplary bolt with a crushable spacer in the bolted flange assembly illustrated in FIG. 3.

Referring to FIGS. 3 and 5, bushings 192 are disposed around a second plurality 194 of the bolts 160 for retaining a flange centerline (flange centerlines coincide with the engine centerline axis 12 during normal engine operation) when at least one of the flanges have been loosened after the spacers have been crushed. The bushings 192 are disposed around the shanks 172 of the second plurality 194 of the bolts 160 and axially extend entirely through the first bolt holes 158. The bushings 192 contact and axially extend between the bolt heads 170 and a second annular flat surface 184 of the second flange 147. Each of the bushings 192 include a tubular bushing body 196 extending axially between a first bushing end 200 and a second bushing end 202.

The exemplary embodiment of the bushings 192 illustrated herein includes a flanged bushing first end 200 having an optional annular bushing flange 204. The annular slot 154 on the first flange 146 is defined in part by annular radially inner and outer lips 206, 208 extending aftwardly from an annular inner slot wall 210 on the first flange 146. The inner and outer lips 206, 208 together with the inner slot wall 210 define annular radially inner and outer rabbets 216, 218. Annular radially inner and outer chamfers 220, 222 are on a forwardmost end 226 of the forward extending annular rail 152 of the second flange 147. Though two rabbets are illustrated herein a single rabbet may also be used to radially center and support the forward bearing support structure 138. The inner and outer rabbets 216, 218 have axially extending inner and outer contact lengths RI, RO along which the rabbets makes metal to metal contact and engage the forward extending annular rail 152.

A gap L may be included between the annular bushing flange 204 and the first annular surface 183 of the first flange 146. The bushing flange 204, an optional feature, is designed to limit how far, axially, the first flange 146 can separate from second flange 147 during the unbalance event. For this aspect of the bushing flange to be effective, the gap L should be less than the longest engagement or contact length, which is illustrated as being the inner contact length RI.

Figure 6:
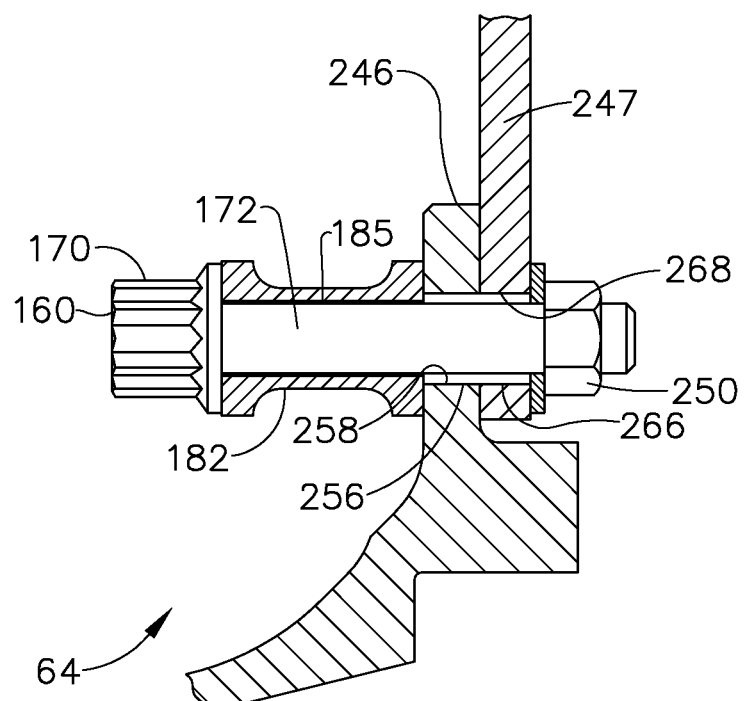
FIG. 6 is a cross-sectional view illustration of the bolt with a flanged bushing in another exemplary bolted flange assembly.

FIG. 6 illustrates an alternative embodiment of the bolted flange assembly 64 of bolted flange assembly in which first and second flanges 246, 247 have first and second circular rows 256, 266 of first and second bolt holes 258, 268 extending axially entirely through the first and second flanges 246, 247. A nut 250 secures the bolts 160. The spacers 182 and bushings are arranged as described above.

The bushings interspersed between the crushable spacers on the bolts is to retain flange centerline after the spacers crush. This is preferred on engines having shafts supported by two bearings not three. For sizing criteria, the crush area of the spacers is sized for maximum assembly clamp as permitted by the bolt, and bolt count is then set to meet or exceed all normal and limit loads as set forth by design practice requirements. As with all fuses, the spacers must transmit normal loads reliably, and only activate under ultimate loads. By sizing for assembly load first, the spacers are pre-stressed to near the yield point and ready to activate with minimum flange separation while maximizing the flange clamp for normal loads. Meanwhile, crush height is set to minimize dynamic loads and tends to cap when other engine axial clearances begin to clash.

The exemplary embodiment of the bolt 160 disclosed herein has a shank outer diameter SD of the shank 172 that is smaller than a thread diameter TD of the thread 174. Because the crushable spacers 182 must fit over the threads 174 during installation, a loose fit may exist between the shank outer diameter SD and a spacer inner diameter ID. This can create non-concentric condition at assembly between the spacer and bolt which, in turn, drives bending into the spacer and bolt with associated non-uniform stresses.

A method proposed herein to address this issue provides heat shrink tubing 185 disposed around and shrunk onto the bolt shank 172 to create an effective shank outer diameter EOD equal to or larger than the thread diameter TD (also referred to as a major diameter) permitting a tight fit with the spacer 182 at the spacer inner diameter ID. This effectively centers the spacers thus improving the compressive stress uniformity within the spacer and permits higher assembly clamp load in order to maximize normal load capability. With the spacer inner diameter ID of the spacer sized to fit over and around the tubing as shrunk onto the bolt shank, the spacer outer diameter of the spacer is then sized for crush area.

Crushable spacer material should have a generally high tensile strength and a ratio of ultimate tensile strength (UTS) to yield strength (YS) ultimate strength as low as possible. The spacer should be sized the for yield strength YS at assembly clamp load, and the buckling is based on an ultimate tensile strength UTS for the load expected at an event such as blade out. The lower the ratio of UTS/YS, the lower the flange load (past flange separation) needed to crush the spacer. The spacer material thermal coefficient of expansion match with the bolt material is also a consideration.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A bolted flange assembly comprising:
   a first flange bolted to a second flange,
   a first circular row of first bolt holes extending axially through the first flange,
   bolts disposed through the first bolt holes and through second holes extending axially at least partially through the second flange,
   each of the bolts including a bolt head, a thread, and a shank therebetween,
   crushable spacers disposed around the shanks of a first plurality of the bolts,
   the spacers contacting and axially extending between the bolt heads of the first plurality of bolts and the first flange,
   bushings disposed around a second plurality of the bolts, and
   the bushings contacting and axially extending between the bolt heads of the second plurality of bolts and the second flange.

2. The assembly as claimed in claim 1, further comprising heat shrink tubing disposed around the bolt shanks of at least some of the bolts associated with the spacers.

3. The assembly as claimed in claim 2, further comprising the spacers contacting the first flange on a first flat annular surface of the first flange and the bushings contacting the second flange on a second flat annular surface of the second flange.

4. The assembly as claimed in claim 2, further comprising the spacers including tubular bodies extending axially between first and second enlarged or flanged ends.

5. The assembly as claimed in claim 1, further comprising:
   the bushings including tubular bushing bodies axially extending between first bushing ends and second bushing ends,
   annular bushing flanges on the first bushing ends adjacent the bolt heads, and
   gaps between the annular bushing flanges and the first flange.

6. The assembly as claimed in claim 1, further comprising the second holes being threaded and extending axially partially through the second flange.

7. The assembly as claimed in claim 6, further comprising:
   the first bolt holes extending axially through the first flange into an aftwardly open annular slot on the first flange,
   the second holes extending partially through a forward extending annular rail of the second flange, and
   the annular rail received within the annular slot.

8. The assembly as claimed in claim 7, further comprising heat shrink tubing disposed around the bolt shanks of at least some of the bolts associated with the spacers.

9. The assembly as claimed in claim 8, further comprising the spacers contacting the first flange on a first flat annular surface of the first flange and the bushings contacting the second flange on a second flat annular surface of the second flange.

10. The assembly as claimed in claim 9, further comprising the spacers including tubular bodies extending axially between first and second enlarged or flanged ends.

11. The assembly as claimed in claim 1, further comprising:
   the first bolt holes extending axially through the first flange,
   the second holes extending partially through a forward extending annular rail of the second flange, and
   the annular rail received within an inner or outer rabbet defined by an inner or outer lip respectively extending aftwardly from the first flange.

12. A gas turbine engine forward bearing system comprising:
   a forward bearing support structure and a fan frame,
   a bolted flange assembly including a first flange at an aft end of the forward bearing support structure bolted to a second flange on the fan frame,
   a first circular row of first bolt holes extending axially through the first flange, bolts disposed through the first bolt holes and through second holes extending axially at least partially through the second flange, each of the bolts including a bolt head, a thread, and a shank therebetween, crushable spacers disposed around the shanks of a first plurality of the bolts, the spacers contacting and axially extending between the bolt heads of the first plurality of bolts and the first flange, bushings disposed around a second plurality of the bolts, and the bushings contacting and axially extending between the bolt heads of the second plurality of bolts and the second flange.

13. The system as claimed in claim 12, further comprising heat shrink tubing disposed around the bolt shanks of at least some of the bolts associated with the spacers.

14. The system as claimed in claim 13, further comprising the spacers contacting the first flange on a first flat annular surface of the first flange and the bushings contacting the second flange on a second flat annular surface of the second flange.

15. The system as claimed in claim 13, further comprising the spacers including tubular bodies extending axially between first and second enlarged or flanged ends.

16. The system as claimed in claim 13, further comprising:
the bushings including tubular bushing bodies axially extending between first bushing ends and second bushing ends,
annular bushing flanges on the first bushing ends adjacent the bolt heads, and
gaps between the annular bushing flanges and the first flange.

17. The system as claimed in claim 13, further comprising the second holes being threaded and extending axially partially through the second flange.

18. The system as claimed in claim 17, further comprising a shank outer diameter of the shanks smaller than a thread diameter of the threads and heat shrink tubing disposed around the bolt shanks of at least some of the spacers.

19. The system as claimed in claim 18, further comprising the spacers contacting the first flange on a first flat annular surface of the first flange and the bushings contacting the second flange on a second flat annular surface of the second flange.

20. The system as claimed in claim 19, further comprising the spacers including tubular bodies extending axially between first and second enlarged or flanged ends.

21. The system as claimed in claim 17, further comprising:
the first bolt holes extending axially through the first flange into an aftwardly open annular slot on the first flange,
the second holes extending partially through a forward extending annular rail of the second flange, and
the annular rail received within the annular slot.

22. The system as claimed in claim 21, further comprising a shank outer diameter of the shanks smaller than a thread diameter of the threads and heat shrink tubing disposed around the bolt shanks of at least some of the spacers.

23. The system as claimed in claim 22, further comprising the spacers including tubular bodies extending axially between first and second enlarged or flanged ends.

24. The assembly as claimed in claim 12, further comprising:
the first bolt holes extending axially through the first flange,
the second holes extending partially through a forward extending annular rail of the second flange, and
the annular rail received within an inner or outer rabbet defined by an inner or outer lip respectively extending aftwardly from the first flange.

25. An aircraft turbofan gas turbine engine comprising:
in downstream serial flow communication a fan, a low pressure compressor or booster, a high pressure compressor, a combustor, a high pressure turbine, and a low pressure turbine circumscribed about an engine centerline axis;
the low pressure turbine joined by a low pressure drive shaft to the fan and the low pressure compressor or booster;
a forward bearing support structure supporting a forward bearing;
the forward bearing rotatably supporting in part the low pressure drive shaft;
a bolted flange assembly including a first flange at an aft end of the forward bearing support structure bolted to a second flange on a fan frame of the engine;
a first circular row of first bolt holes extending axially through the first flange;
bolts disposed through the first bolt holes and through second holes extending axially at least partially through the second flange;
crushable spacers disposed around the shanks of a first plurality of the bolts;
the spacers contacting and axially extending between the bolt heads of the first plurality of bolts and the first flange;
bushings disposed around a second plurality of the bolts; and
the bushings contacting and axially extending between the bolt heads of the second plurality of bolts and the second flange.

26. The engine as claimed in claim 25, further comprising heat shrink tubing disposed around the bolt shanks of at least some of the bolts associated with the spacers.

27. The engine as claimed in claim 26, further comprising the spacers including tubular bodies extending axially between first and second enlarged or flanged ends.

28. The engine as claimed in claim 25, further comprising the second holes being threaded and extending axially partially through the second flange.

29. The engine as claimed in claim 28, further comprising:
the first bolt holes extending axially through the first flange into an aftwardly open annular slot on the first flange,
the second holes extending partially through a forward extending annular rail of the second flange, and
the annular rail received within the annular slot.

30. The engine as claimed in claim 29, further comprising a shank outer diameter of the shanks smaller than a thread diameter of the threads and heat shrink tubing disposed around the bolt shanks of at least some of the spacers.

31. The engine as claimed in claim 30, further comprising the spacers including tubular bodies extending axially between first and second enlarged or flanged ends.

32. The engine as claimed in claim 31, further comprising the spacers contacting the first flange on a first flat annular surface of the first flange and the bushings contacting the second flange on a second flat annular surface of the second flange.

33. The engine as claimed in claim 25, further comprising:
the first bolt holes extending axially through the first flange, the second holes extending partially through a forward extending annular rail of the second flange, and the annular rail received within an inner or outer rabbet defined by an inner or outer lip respectively extending aftwardly from the first flange.

34. The engine as claimed in claim 25, further comprising:

the bushings including tubular bushing bodies axially extending between first bushing ends and second bushing ends, annular bushing flanges on the first bushing ends adjacent the bolt heads, and gaps between the annular bushing flanges and the first flange.

* * * * *